(12) United States Patent
Risicato et al.

(10) Patent No.: US 11,173,633 B2
(45) Date of Patent: Nov. 16, 2021

(54) PREFORM, FRAMEWORK PART, AND METHOD FOR PRODUCING SUCH A PREFORM

(71) Applicant: PORCHER INDUSTRIES, Badinieres (FR)

(72) Inventors: Jean Vincent Risicato, Beaucroissant (FR); Patrick Varaniac, Tramolé (FR)

(73) Assignee: PORCHER INDUSTRIES, Badinieres (FR)

( * ) Notice: Subject to any disclaimer, the term of this patent is extended or adjusted under 35 U.S.C. 154(b) by 463 days.

(21) Appl. No.: 16/329,822

(22) PCT Filed: Sep. 1, 2017

(86) PCT No.: PCT/EP2017/071949
§ 371 (c)(1),
(2) Date: Mar. 1, 2019

(87) PCT Pub. No.: WO2018/041992
PCT Pub. Date: Mar. 8, 2018

(65) Prior Publication Data
US 2019/0224885 A1 Jul. 25, 2019

(30) Foreign Application Priority Data
Sep. 2, 2016 (FR) .................................. 1658182

(51) Int. Cl.
*B29B 11/16* (2006.01)
*B29C 70/24* (2006.01)
(Continued)

(52) U.S. Cl.
CPC .............. *B29B 11/16* (2013.01); *B29C 70/24* (2013.01); *D03D 25/005* (2013.01);
(Continued)

(58) Field of Classification Search
CPC ....... B29B 11/16; B29C 70/24; D03D 25/005; B64C 1/064; B64C 3/182;
(Continued)

(56) References Cited

U.S. PATENT DOCUMENTS 8,685,868 B2 4/2014 Bouillon et al.
9,597,841 B2 3/2017 Snecma
(Continued)

FOREIGN PATENT DOCUMENTS

EP 2423441 A2 * 2/2012 ............. F01D 5/147

OTHER PUBLICATIONS

International Search Report for PCT/EP2017/071949, dated Nov. 8, 2017.
(Continued)

*Primary Examiner* — Brian Handville
(74) *Attorney, Agent, or Firm* — B. Aaron Schulman, Esq.; Stites & Harbison, PLLC (57) ABSTRACT

Said preform (3) defining two parts (21, 23) and comprising: a first group (C1) of layers of warp yarns, which is external in the first part, a second group (C2) of layers of warp yarns immediately beneath said first group, and a first group (T1) of layers of weft yarns which is external in the first part. Furthermore, the first group of layers of warp yarns is absent in the second part and the first group of layers of weft yarns (19) extends into the second part, the first group of layers of weft yarns being external in the second part. The yarns of the first weft group have a lower yarn count than the yarns of the second weft group; and/or the yarns of the first warp group have a lower yarn count than the yarns of the second warp group.

11 Claims, 3 Drawing Sheets

(51) Int. Cl.
  *D03D 25/00* (2006.01)
  *B29L 31/00* (2006.01)
  *B29K 307/04* (2006.01)
  *B64C 1/06* (2006.01)
  *B64C 3/18* (2006.01)
  *B64C 1/00* (2006.01)

(52) U.S. Cl.
  CPC ..... *B29K 2307/04* (2013.01); *B29L 2031/001* (2013.01); *B64C 1/064* (2013.01); *B64C 3/182* (2013.01); *B64C 2001/0072* (2013.01)

(58) Field of Classification Search
  CPC ....... B64C 2001/0072; B29L 2031/001; B29K 2307/04; Y02T 50/40
  See application file for complete search history.

(56) References Cited

U.S. PATENT DOCUMENTS

| | | | |
|---|---|---|---|
| 9,617,858 B2 | 4/2017 | Snecma | |
| 2011/0182743 A1* | 7/2011 | Naik | D03D 11/00 416/230 |
| 2011/0277869 A1* | 11/2011 | Coupe | D03D 25/005 139/11 |
| 2012/0051935 A1* | 3/2012 | Naik | F04D 29/023 416/230 |
| 2014/0246113 A1* | 9/2014 | Sutton | D03D 25/005 139/304 |
| 2014/0334935 A1* | 11/2014 | Dambrine | F01D 5/286 416/223 A |
| 2014/0369847 A1* | 12/2014 | Dambrine | D03D 41/004 416/230 |

OTHER PUBLICATIONS

Written Opinion of the International Searching Authority for PCT/EP2017/071949, dated Nov. 8, 2017.
Preliminary Search Report for FR 1658182, dated Jun. 27, 2017.

* cited by examiner

PREFORM, FRAMEWORK PART, AND METHOD FOR PRODUCING SUCH A PREFORM

The invention relates to a preform, in particular for a stiffener, with a three-dimensional fibrous structure, a framework part, in particular a stiffener, comprising such a preform, as well as a method for manufacturing such a preform.

The invention relates to the production of parts from a composite material, and more particularly fibrous reinforcing structures of such parts, these fibrous structures being obtained by three-dimensional weaving or 3D weaving. More specifically, one seeks to produce a fibrous structure preform, which has a final or quasi-final shape and dimensions of the composite material part to be produced. Such a preform is designed subsequently to be densified, i.e., consolidated, with a resin matrix to form the composite material part.

One field of application of the invention is the production of framework parts, in particular beams or stiffeners, from composite material, with fibrous reinforcements and resin matrix. Such parts, generally with an elongate shape, are used in many fields, in particular aeronautic construction. The invention in particular targets the production of parts having a thin portion over at least a longitudinal edge of the structural part.

In the case of composite parts having thin portions, like the connecting portions of stiffeners or the trailing edges of vane blades for turbine engines, there is reason to keep the three-dimensional structure into these thin portions while keeping the structural continuity with the thicker portions. The typical practice consisting, during weaving, of removing yarns in the warp and/or weft direction, may cause excessive variations in the fiber rate and unraveling of the thin portions at their end.

WO-A1-2006/136755 proposes a reinforcing structure comprising an inner portion, or core, and a portion adjacent to an outer surface, or skin, the fibrous structure being formed by core three-dimensional weaving, skin and core being formed by different weaves. The thickness reduction of the structure is obtained by a smaller number of layers of weft yarns in the thin portions and the document proposes to have a transitional zone between thick portion and thin portion in the form of an additional partial layer of weft yarns, connected by weaving with two complete layers of weft yarns between which it is arranged, using an interlock-type weave. The document further mentions, without other precision, that the yarn count of the yarns between the core and the skin may vary, to promote access to the core by the gas through the skin in the case of CVI densification. Since the document only mentions a "decreasing yarn count between core and skin", the document does not specify which yarns, from among the skin or core yarns, have the highest yarn count.

Indeed, the aforementioned expression does not indicate whether the decrease in the yarn count of the yarns originates from the core or the skin and does not make it possible to conclude which yarns have the lowest yarn count and which yarns have the highest yarn count. Furthermore, this solution does not aim to obtain particularly thin portions like the ends of fastening tabs of the stiffeners.

WO-A1-2013/088039 proposes a fibrous reinforcing structure made in a single piece by multi-layer weaving, by incorporating at least one layer of yarns of variable yarn count, each yarn of said layer being formed by a separable assembly of yarns, such that, in the thin portions, the yarn count of said yarns is decreased by elimination of separable fibers. This is combined with a gradual reduction in the number of layers of weft yarns in the thin portions. However, the removal of these elementary yarns complexifies the weaving method.

WO-2013/088038 A2 proposes a fibrous structure for reinforcing a part made from composite material, said structure being woven in one piece by multilayer weaving, between a first plurality of layers of yarns and a second plurality of layers of yarns, the fibrous structure comprising at least one portion of decreasing thickness. In the portion of decreasing thickness, the fibrous structure includes, on the surface:
one or several yarn removal portions in surface continuity in each of which yarns from a layer of yarns of the first plurality of layers of yarns underlying the layer of yarns of the first plurality of layers of yarns located on the surface of the structure are interrupted,
one or several yarn removal portions in surface discontinuity in each of which yarns of the layer of yarns of the first plurality of layers of yarns located on the surface of the structure are interrupted, each interrupted yarn being replaced on the surface of the structure by a yarn from a layer of yarns underlying the first plurality of layers of yarns.

Furthermore, the yarns of the layers of the second plurality of layers of yarns located on the surface of the fibrous structure are continuous over at least the entire portion of decreasing thickness.

The invention therefore aims to propose a new preform, which, while being particularly not thick in its thin portion(s), has a particularly reduced risk of fraying in this portion and is relatively easy to manufacture.

The invention relates to a preform, in particular for a stiffener, with a three-dimensional fibrous structure having a thickness and being woven in a single piece by multilayer weaving of layers of warp yarns and layers of weft yarns distributed along the thickness, the preform defining at least one first portion and at least one second portion extending the first portion toward a thin edge of the preform, the preform comprising:
a first group of successive layers of warp yarns, which includes at least one layer of warp yarns and which is external in the first portion,
a second group of successive layers of warp yarns, which includes at least one layer of warp yarns and which is located immediately below the first group of layers of warp yarns, and
a first group of successive layers of weft yarns, which includes at least one layer of weft yarns and which is connected according to a weave with the first group of layers of warp yarns, so as to be external in the first portion.

Furthermore, the number of layers of warp yarns forming the second portion is smaller relative to the number of layers of warp yarns forming the first portion, due to the absence of the first group of layers of warp yarns in the second portion, such that the second portion has a smaller thickness relative to that of the first portion and such that the second group of layers of warp yarns is external in the second portion.

Furthermore, the first group of layers of weft yarns extends into the second portion, while being connected according to a weave with the second group of layers of warp yarns in the second portion, such that the first group of layers of weft yarns is also external in the second portion.

According to the invention:
the weft yarns of the first group of layers of weft yarns have a yarn size smaller than the yarn size of the weft yarns of the second group of layers of weft yarns; and/or the warp yarns of the first group of layers of warp yarns have a yarn size smaller than the yarn size of the warp yarns of the second group of layers of warp yarns.

Owing to the invention, the risk of fraying is reduced even in the case where the second portion has a very small thickness, since the first group of layers of weft yarns is arranged outside the first portion and the second portion without discontinuity. In particular, the preform advantageously has a substantially continuous surface state with a junction between the first portion and the second portion. The manufacture of the preform, however, remains relatively simple, given that the first group of layers of weft yarns can be integrated into the fibrous structure during the three-dimensional weaving of the latter. Furthermore, a three-dimensional loom can easily be configured so that the number of yarns of each layer of warp yarns is different from one portion to the other and to connect the first group of layers of weft yarns both to the second group of layers of warp yarns in the second portion and to the first group of layers of warp yarns in the first portion.

In general, varying the yarn size of the preform makes it possible to obtain a particularly low thickness, in particular near the thin edge, where the number of internal layers is low.

According to other optional and advantageous features of the invention, considered alone or in combination:
the preform comprises a second group of successive layers of weft yarns, which includes at least one layer of weft yarns and which is located immediately below the first group of layers of weft yarns in the first portion, the second group of layers of weft yarns being absent from the second portion, for example by interruption of the weft yarns of said second layer of weft yarns, at a junction of the first portion with the second portion.
the preform contains 6K yarns and 3K yarns.
the second portion comprises at least three layers of warp yarns.
the preform comprises a third portion extending the second portion toward the thin edge, while the preform comprises a third group of successive layers of warp yarns, which includes at least one layer of warp yarns and which is located immediately below the second group of layers of warp yarns in the second part, while the number of layers of warp yarns forming the third portion is reduced relative to the number of layers of warp yarns forming the second portion, due to an absence of the second group of layers of warp yarns in the third portion, such that the third portion has a smaller thickness relative to that of the second portion and such that the third group of layers of warp yarns is external in the third portion, and while the first group of layers of weft yarns extends into the third portion, while being connected according to a weave with the third group of layers of warp yarns in the third portion, such that the first group of layers of weft yarns is also external in the third portion.
a plurality of warp yarns and/or weft yarns of the preform bears a hardened polymer contributing a degree of cohesion to the preform at least in the second portion.
the thin edge is welded using said hardened polymer borne by the yarns.

The invention also relates to a framework part, in particular a stiffener, comprising a preform as defined above, as well as a consolidating material, of the resin type, with which the fibrous structure of the preform is impregnated.

The invention also relates to a method for manufacturing a preform, in particular for a stiffener, with a three-dimensional fibrous structure having a thickness and being woven in a single piece, the manufacturing method comprising a step for multilayer weaving of layers of warp yarns and layers of weft yarns distributed along the thickness, wherein one defines at least one first portion and at least one second portion extending the first portion toward a thin edge of the preform, such that the preform comprises:
a first group of successive layers of warp yarns, which includes at least one layer of warp yarns and which is external in the first portion,
a second group of successive layers of warp yarns, which includes at least one layer of warp yarns and which is located immediately below the first group of layers of warp yarns, and
a first group of successive layers of weft yarns, which includes at least one layer of weft yarns and which is connected according to a weave with the first group of layers of warp yarns, so as to be external in the first portion.

Furthermore, to form the second part:
the number of layers of warp yarns in the second portion is reduced relative to the number of layers of warp yarns forming the first portion, this reduction being obtained by the absence of the first group of layers of warp yarns in the second portion, such that the second portion has a smaller thickness relative to that of the first portion and such that the second group of layers of warp yarns is external in the second portion, and
the first group of layers of weft yarns is bonded according to a weave, with the second group of layers of warp yarns in the second portion, such that the first group of layers of weft yarns is also external in the second portion.

According to the invention:
the weft yarns of the first group of layers of weft yarns have a yarn size smaller than the yarn size of the weft yarns of the second group of layers of weft yarns; and/or
the warp yarns of the first group of layers of warp yarns have a yarn size smaller than the yarn size of the warp yarns of the second group of layers of warp yarns.

Preferably, the preform comprises a second group of layers of weft yarns, which includes at least one layer of weft yarns and which is located immediately below the first group of layers of weft yarns in the first portion, while at the second portion, an excess portion of the weft yarns of the second group of layers of weft yarns comes out of the fibrous structure, and the excess portion is cut.

The invention will be better understood upon reading the following description, given solely as a non-limiting example and done in reference to the drawings, in which.

The figures are oriented according to an orthonormal coordinate system R1, defining three directions in space X, Y and Z.

Figure 1:
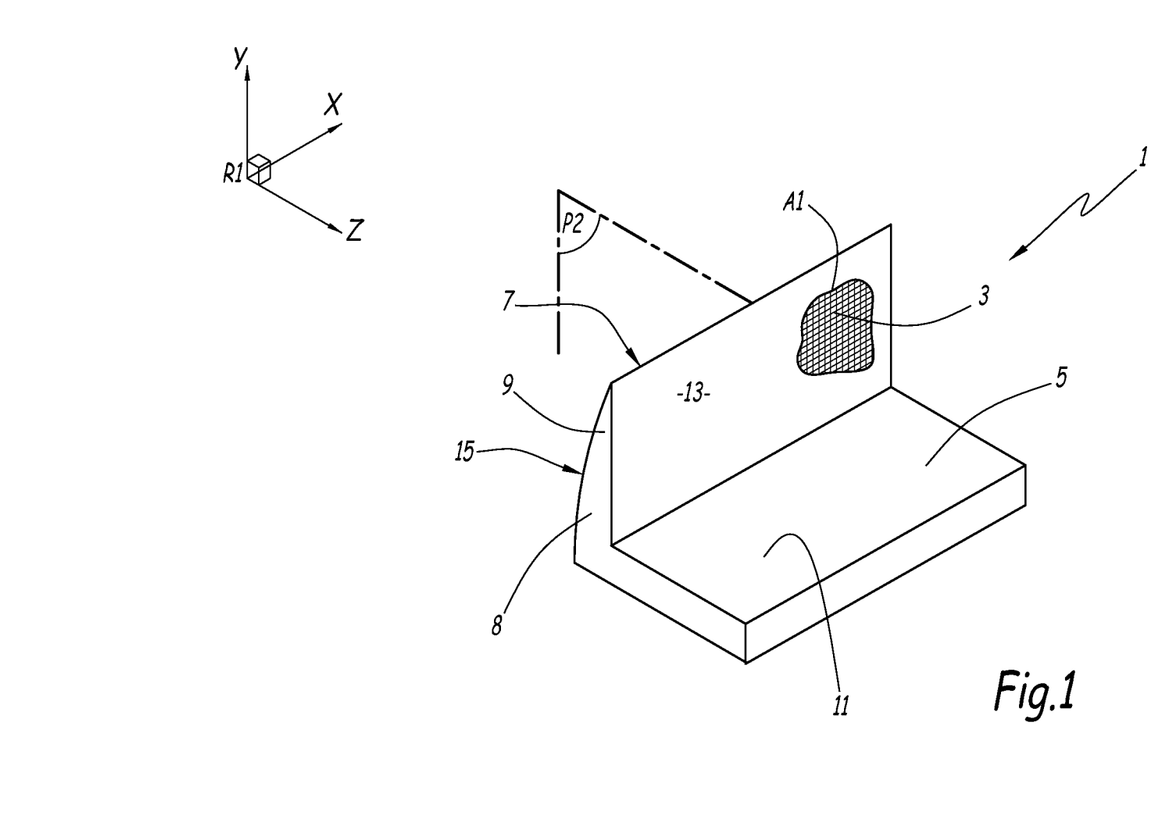
FIG. 1 is a schematic perspective view of a stiffener including a fibrous structure preform according to a first embodiment of the invention.

The stiffener 1 of FIG. 1 constitutes a framework part, i.e., a structural part such as a stringer, pillar or beam, for a vehicle, preferably an aircraft. The coordinate system R1, attached to the stiffener 1, is oriented such that the direction X is parallel to the longitudinal axis of the stiffener 1, the directions Y and Z to transverse directions of the stiffener 1.

The stiffener 1 is made from a composite material comprising a preform 3 with a three-dimensional fibrous structure, the preform 3 being consolidated, for example by impregnation with a consolidating or reinforcing material 5 forming a matrix, of the resin type. Preferably, the resin is a thermoplastic or thermosetting resin.

The preform 3 is woven in a single piece using a multi-layer three-dimensional weaving method, including successive layers of warp yarns 17, the yarns 17 of which extend in the direction X. The layers of weft yarns 19 extend either in the direction Y or in the direction Z, as a function of the considered part of the stiffener. In particular, in a portion 9, forming a blade of the stiffener 1, the weft yarns extend in the direction Y, and the layers of warp yarns 17 and weft yarns 19 are distributed, i.e., stacked, in the direction Z, oriented along the thickness of the blade 9, while being connected to one another by weaving. Thus, the yarns 17 and 19 are rippled and interlaced with one another according to one or more predetermined weaves.

The warp yarns 17 and the weft yarns 19 are for example made from an organic material, such as polypropylene (PP), viscose, polyamide 6.6 (PA66), polyethylene (PE), polyvinyl acetate (PVA), para-aramid, or poly(p-phenylene-2,6-benzobisoxazole) (PBO), or an inorganic material, such as steel, carbon, silicon carbide, silica, E glass, S glass or R glass.

Preferably, the preform 3 is distributed entirely or quasi-entirely in the volume of the stiffener 1.

The preform 3, at the end of its weaving, a potential step for cutting nonwoven yarns and a potential step for preforming as defined hereinafter, advantageously has a shape identical or quasi-identical to that of the stiffener 1 consolidated with the consolidating material 5. In other words, the concentration in fibrous structure of the stiffener 1 is preferably substantially constant in the entire volume of the stiffener 1, or practically all of this volume. For example, the volume rate of fibers in the stiffener 1 is between about 30% and 80%.

Alternatively, the fibrous structure concentration of the stiffener 1 differs in certain areas of the stiffener 1, depending on the desired application.

Also preferably, the stiffener 1 comprises a single preform 3 made in one piece.

In practice, the preform 3 itself forms a stable structure in which the consolidating material 5 is injected, for example within a mold, to form the stiffener 1. Optionally, the preform 3 occupies a slightly greater space in the mold and must be slightly compacted to be introduced into the mold before injection of the consolidating material.

In practice, the preform 3 is flush with all or part of the external surface of the stiffener 1, which is shown schematically on a local portion A1 of an external surface of the stiffener 1 of FIG. 1.

The stiffener 1 and the preform 3 have a section, taken along the plane YZ, that is preferably constant in the direction X. At the blade 9, this section along YZ has, along the direction Y, a variable thickness along the direction Z. In particular, the blade 9 has a thin edge 7, extending parallel to the direction X. From the thin edge 7, the blade 9 will become thicker parallel to the direction Y. The blade 9 has a base 8, opposite the thin edge 7, from which a low wall 11, or rib, rises from the stiffener 1. In practice, the fibrous structure of the preform 3 is woven flat, i.e., the blade 9 and the low wall 11 are initially formed horizontally in the same plane XY, which in turn is oriented horizontally. During a preforming step of the preform 3, the orientation and the final shape of the low wall 11 are obtained by deformation or deployment of the fibrous structure. The low wall 11 is then inclined relative to the blade 9, and extends in the plane XZ, as illustrated in FIG. 1, while the blade extends in the perpendicular plane XY. Thus, all or some of the weft yarns of the low wall 11 extend perpendicularly to the weft yarns of the blade 9, in the case at hand parallel to the direction Z.

More specifically, before the preforming step, the fibrous structure intended to form the preform 3 includes at least one disconnect in a plane defined between two successive layers of warp and/or weft yarns. "Disconnect" means that two consecutive layers of yarns, in the direction of the thickness of the fibrous structure, are not connected to one another over a certain surface, but come back together where the disconnect is interrupted. Owing to this disconnect, the two separated parts may be moved away from one another, which allows the deployment of the fibrous structure to give it its final preform shape 3.

Furthermore, all or a determined fraction of the warp yarns and/or weft yarns of the fibrous structure, which is woven flat and which is intended to form the preform 3, bears a heat-sensitive polymer on the surface. During the preforming step, after deployment of the fibrous structure, a heat treatment of the preform 3 is done seeking to soften said polymer, then cooling, in order to fix the preformation of the preform 3. The preform 3 then includes at least one portion in which the warp yarns 17 and the weft yarns 19 are bonded to their intersections by polymer, where at least one of the warp 17 and/or weft 19 yarns bears polymer. The polymer is in the hardened state. The bonding at the intersection points is obtained by softening, then hardening of the polymer through appropriate heating.

It is also possible to define the preform as comprising a textile structure, the weaving of which has been done by using warp yarns and/or weft yarns bearing the heat-sensitive polymer on the surface. The passage to the preform is done by thermoforming at a temperature higher than the softening point of the polymer, followed by cooling, owing to which the warp yarns and the weft yarns are bonded to their intersections by polymer, where at least warp and/or weft yarns bear polymer.

The polymer present on the yarns is set, if it is thermosetting, it is hardened, if it is thermoplastic. It is below its glass transition temperature. Thermosetting or thermoplastic, the polymer has a softening temperature that may correspond to its Tg. Passing this temperature leads to a reversible softening allowing, on the one hand, the bonding of the coated yarns, i.e., at least one of the warp yarn and the weft yarn in contact, at their point of intersection, and on the other hand, the deployment of the fibrous structure in its "preform" form. Cooling below this temperature then sets the preform, ready to be impregnated with consolidating material, and easy to manipulate.

The polymer in contact with some warp and/or weft yarns may be chosen from among thermoplastic and thermosetting polymers, including copolymers. It may be identical to or different from the polymer that will next be injected or infused. Examples in particular include: polyamides (PA), copolyamides (CoPA), polyether or ester block amides (PE- BAX, PEBA), polyphthalamides (PPA), polyesters (in particular polyethylene terephthalate-PET-, polybutylene terephthalat-PBT-), copolyesters (CoPE), thermoplastic polyurethanes (TPU), polyacetals (POM, etc.), polyolefins (in particular PP, HDPE, LDPE, LLDPE), polyethersulfones (PES), polysulfones (PSU, etc.), polyphenylene sulfones (PPSU, etc.); polymers from the family of PAEK polyaryletherketones in particular comprising polyetheretherketones (PEEK) and polyetherketoneketone (PEKK); polyphenylene sulfide (PPS), polyetherimides (PEI), thermoplastic polyimides, liquid crystal polymers (LCP), phenoxys, block copolymers such as styrene-butadiene-methylmethacrylate copolymers (SBM), butyl-methylmethacrylate methylmethacrylate-acrylate copolymers (MMA) and mixtures thereof, epoxies, bismaleimide, phenolic polymers.

Irrespective of the method for preforming the preform 3, the blade 9 is delimited by a planar surface 13 extending in the plane XY, and by an oblique surface 15, which is curved in the present example. The oblique surface 15 is inclined relative to the plane XY, such that the surfaces 13 and 15 converge toward one another up to the thin edge 7 by which they end. Alternatively, the oblique surface 15 is planar, or has another shape, the projection of which in the plane YZ is monotonous and convergent relative to the plane XY. Likewise, the surface 13 can be oblique relative to the plane XY, while being planar, curved, or another shape, the projection of which in the plane YZ is monotonous and convergent relative to the plane XY.

Figure 2:
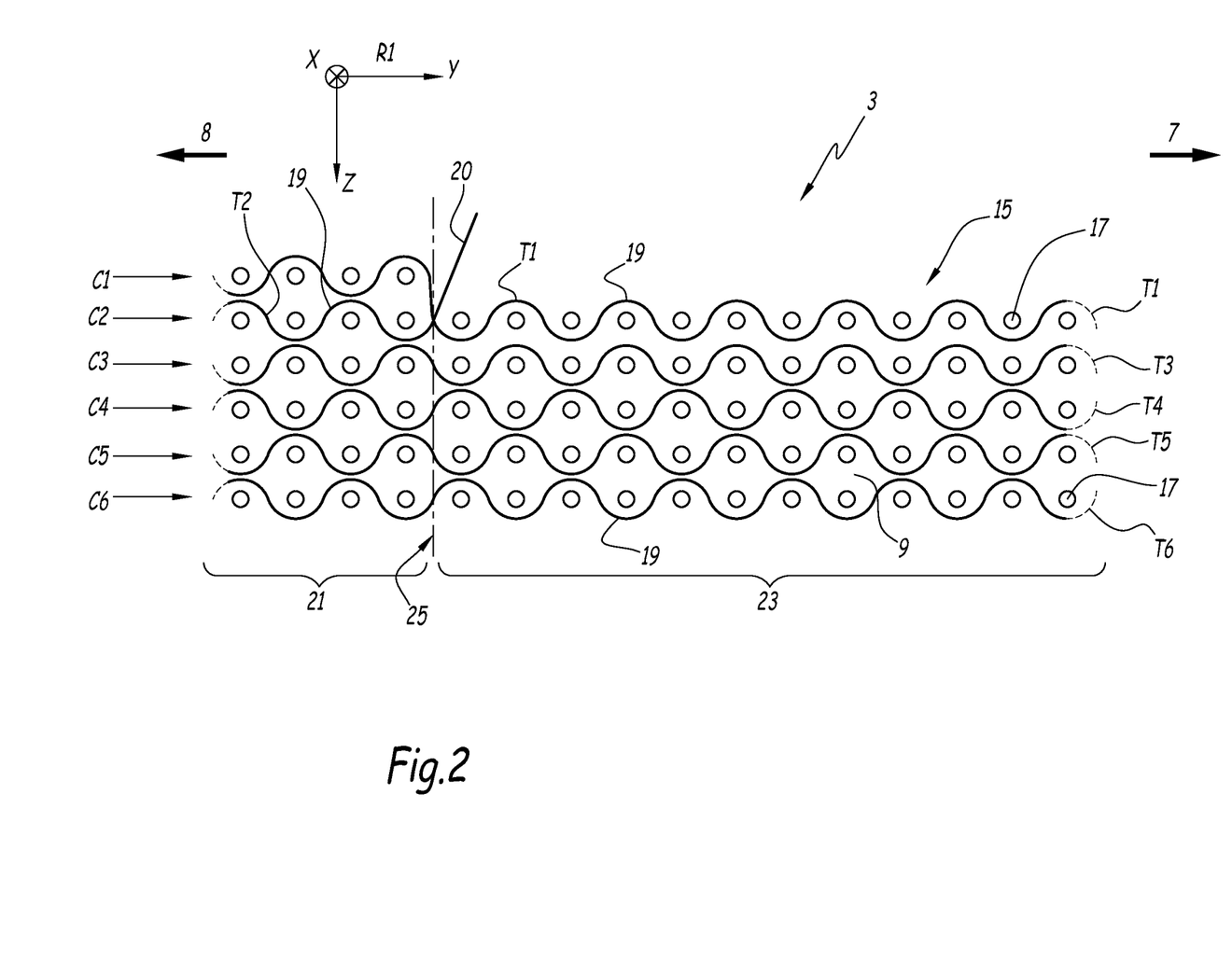
FIG. 2 is a sectional view, along a plane P2, showing a detail of the preform of FIG. 1 enlarged.

FIG. 2 shows, very schematically, a sectional view along a plane P2 parallel to the plane YZ of an area of the blade 9, on a large enough scale for the warp yarns 17 and the weft yarns 19 to be visible in said FIG. 2. The oblique surface 15 visible in FIG. 1 is found at the top of FIG. 2. The thin edge 7 and the base 8 are not visible in FIG. 2, but are located outside FIG. 2, respectively to the right and the left of the latter, as symbolized by arrows 7 and 8, respectively. The warp yarns 17, extending in the direction X, are shown intersected by the plane P2, while the weft yarns 19 extend along said plane P2, parallel to the direction Y.

The preform 3 defines a first portion 21 and a second portion 23 along the direction Y. The portion 21 is called "thick", since it has a thickness in the direction Z, the value of which is greater than that of the portion 23, which is therefore described as "thin". The thin portion 23 extends the thick portion 21 from a junction 25 of the preform 3. In other words, the thin portion 23 continues the thick portion 21, the boundary between the thin portion 23 and the thick portion being situated at the junction 25. More specifically, the junction 25 is situated immediately adjacent to the last of the warp yarns 17 of the first layer C1. The thin portion 23 extends from the junction 25 to the thin edge 7 of the preform 3. The thick portion 21 in turn extends from the junction 25 to the base 8 of the blade 9 of the preform 3.

The preform 3 comprises, at least in the thick portion 21 and the thin portion 23, a plurality of successive layers of warp yarns 17 distributed in the direction of the thickness of the preform 3, including successive layers C1, C2, C3, C4, C5, C6, as well as other subsequent layers not visible in FIG. 2. "Successive" means that the layer C2 is located immediately below the layer C1, the layer C3 is located immediately below the layer C2, and so forth. "Successive" means that the designated layers are distributed in the indicated order, from the external part toward the core of the preform 3. "Immediately" means that no other layer of warp yarns 17 is inserted between a first layer of warp yarns 17 and a second layer of warp yarns 17 situated immediately below said first layer of warp yarns 17. Conversely, weft yarns may be inserted between two layers of warp yarns immediately below one another.

"External", or the expression "skin", describes a layer or a group of successive layers, for yarns in a same direction, either weft or warp, said layer or group being closest to the surface of the preform 3, in the direction of the thickness, i.e., in the direction Z in the present example. By opposition, "internal" or "core" refers to any layer or group of successive layers of yarns in the same direction, either weft or warp, layer or group that is separated from the surface of the preform 3 by at least one external layer of yarns in the same direction.

In the example of FIG. 2, the first layer C1 is external in the thick portion 21. Thus, in the thick portion 21, the layer C1 extends at the surface 15, and forms a skin layer of the preform 3.

The number of layers of warp yarns 17 making up the thin portion 23 is smaller relative to the number of layers of warp yarns 17 forming the thick portion 21, due to an absence of the first layer C1 of warp yarns 17 in the thin portion 23. Thus, the thin portion 23 has a smaller thickness relative to the thickness of the thick portion 21. In the thin portion 23, from the junction 25, the first layer C1 of warp yarns 17 is interrupted, or absent. In other words, the preform 3 has no warp yarns 17 at the layer C1 in the thin portion 23. Owing to this absence of the layer C1 in the thin portion 23, the thickness measured in the direction Z of the thin portion 23 is smaller than the thickness in the direction Z of the thick portion 21. Due to this absence of the layer C1 in the thin portion 23 as well, the second layer of warp yarns C2 is external in the thin portion 23, while extending in the thick portion 21 below the layer C1, such that the layer C2 is internal in the thick portion while being immediately below the layer C1.

The blade 9 of the preform 3 also comprises a plurality of layers of weft yarns 19, including the successive layers T1, T2, T3, T4, T5 and T6, visible in FIG. 2, as well as other subsequent layers of weft yarns not visible in FIG. 2. The weft yarns 19 of each layer are connected according to a weave with at least one of the layers of warp yarns 17.

The second layer T2 of weft yarns is located immediately below the first layer T1 of weft yarns 19 in the thick portion 21. The third layer T3 of weft yarns 19 is located immediately below the second layer T2, in the thick portion 21, and immediately below the first layer T1 in the thin portion 23. The fourth layer of weft yarns T4 is located immediately below the third layer of weft yarns T3 in the thin portion 23, and in the thick portion 21. The fifth layer T5 is located immediately below the fourth layer T4, while the sixth layer T6 is located immediately below the fifth layer T5. "Immediately" means that no other layer of weft yarns 19 is inserted between a first layer of weft yarns 19 and a second layer of weft yarns 19 situated immediately below said first layer of weft yarns 19. Conversely, warp yarns may be inserted between two layers of weft yarns immediately below one another.

The first layer T1 of weft yarns 19 is connected according to a weave with the first layer C1 of warp yarns 17, so as to be external in the thick portion 21. From the junction 25, the first layer of weft yarns T1 drops a row in the direction of the thickness, so as to extend into the thin portion 23, while being connected according to a weave with the second layer C2 of warp yarns 17 in the thin portion 23. In this way, the first layer T1 of weft yarns 19 is also external in the thin portion 23. The first layer T1 thus forms a skin layer in the direction Y, both in the thick portion 21 and in the thin portion 23.

To obtain this particular arrangement, the second layer T2 of weft yarns 19 located immediately below the first layer T1 of weft yarns 19 in the thick portion 21, is missing in the thin portion 23 from the junction 25. To that end, as illustrated in FIG. 2, an excess portion 20 of all or some of the weft yarns 19 of the second layer T2 is advantageously removed outside the fibrous structure of the preform 3 at the junction 25, through the first layer T1 of weft yarns 19. In other words, the excess portion 20 rotates around the last warp yarn 17 of the first layer C1, or an adjacent warp yarn 17, while being oriented toward the outside of the preform 3. These excess portions 20 are advantageously cut so as to guarantee the regularity of the surface condition of the surface 15. In any case, all or some of the weft yarns 19 of the second layer T2 are interrupted from the junction 25, in the thin portion 23.

According to an alternative that is not illustrated, all or some of the weft yarns 19 of the second layer T2 are not cut, but are woven in the thin portion 23, while being woven according to a weave with said thin portion 23, in particular with yarns 17 of the second layer C2 and/or the third layer C3, said weave being less interlaced than the weave connecting said same layer T2 of weft yarns 19 with the warp yarns 17 in the thick portion 21. Preferably, in this alternative, all or some of the weft yarns 19 of the third layer T3 and optionally other lower layers of weft yarns 19, also have a less interlaced weave in the thin portion 23 than in the thick portion 21.

Whatever the variant, one thus obtains a gradual decrease of the thickness of the blade 9 toward the thin edge 7, i.e., a difference in thickness in the direction Z of the three-dimensional structure, at the junction 25. The layer T1 forming a skin of the three-dimensional structure, the surface condition of the preform 3 is continuous despite this difference in thickness.

The preform 3 advantageously comprises a third portion, not visible in FIG. 1, extending the portion 23 toward the thin edge 7 from a junction, not visible in FIG. 1, similar to the junction 25. According to a diagram similar to that of FIG. 1 for the junction 25, the number of layers of warp yarns 17 making up the third portion is smaller relative to the number of layers of warp yarns 17 forming the portion 23, due to an absence of the second layer C2 of warp yarns 17 in the third portion. Thus, the third portion has a smaller thickness relative to that of the portion 230. Furthermore, the third layer C3 of warp yarns 17 is external in the third portion. Moreover, the first layer T1 of weft yarns 19 extends into the third portion, while being connected according to a weave with the third layer C3 of warp yarns 17 in the third portion. The first layer T1 is therefore also external in the third portion and thus forms a continuous skin along all of the portions of the blade 9. According to the same scheme repeated up to the thin edge 7, increasingly thin successive portions separated by junctions similar to the preceding can be built in order to produce a gradual reduction in the thickness of the blade 9 up to the thin edge 7. The incline of the surface 15 relative to the plane XY, as well as any curvature of the surface 15, are obtained by a succession of junctions 25 similar to that of FIG. 2 and advantageously using the aforementioned preforming step, the junctions 25 being distributed in the direction Y. Each of these junctions separates a thicker portion from a portion of lesser thickness. Over the course of the succession of junctions, the thickness in the direction Z of the preform 3 is reduced, in the case at hand by one or several layers of yarns 17 and 19 at each junction 25, the first layer T1 advantageously extending externally from the base 8 to the thin edge 7. In other words, the first layer T1 forms a continuous skin layer of the preform 3, from the base 8 to the thin edge 7.

To obtain the incline of the surface 13, a similar diagram can be applied, in particular symmetrically.

Preferably, the weft yarns 19 of the first layer T1 of weft yarns 19 have a yarn size smaller than the yarn size of the weft yarns 19 of the second layer C2 of weft yarns 19. Likewise, the warp yarns 17 of the first layer C1 have a yarn size smaller than the yarn size of the warp yarns 17 of the second layer C2. In a manner known in itself, the yarn size or numbering of a yarn corresponds to the size of the yarn, which may be defined in many ways, in particular by its number of component filaments. In this case, the yarn size is expressed in "K", which corresponds to the number in thousands of filaments per yarn. In a manner known in itself, the yarn size of a yarn may alternatively be defined in particular by its linear mass or other similar or equivalent properties.

For example, the yarns of the preform 3 that have a smaller yarn size have a yarn size that is smaller than a ratio of at least 1.5 relative to the other yarn sizes of the preform 3, in particular a ratio of about 2.5 or 3, in the case of carbon yarns. Particularly preferably, the preform 3 contains 3K yarns, which form the smaller yarn size yarns, and 6K yarns, which form the larger yarn size yarns.

In general, the layers of warp yarns 17 and weft yarns 19 that are located near the layers C1 and T1, as well as these layers C1 and T1, have yarns having a yarn size smaller than other yarns of the preform 3 located more at the core, i.e., included in the internal layers close to a median distance, parallel to the direction Z, between the surfaces 15 and 13. This variation of the yarn size of the preform 3 makes it possible to obtain a particularly low thickness, in particular near the thin edge 7, where the number of internal layers is low.

In the example of FIG. 2, the thin portion 23 comprises at least five layers of warp yarns 17. Alternatively, the thin portion 23 may comprise fewer or more layers of warp yarns 17. In any case, the thin portion 23 comprises fewer than three layers of warp yarns 17.

Preferably, the number of layers of weft yarns 19 corresponds to the number of layers of warp yarns 17. However, it is possible to provide a number of layers of warp yarns 17 lower or higher than that of the layers of weft yarns 19, with a difference of one or several layers, in particular as a function of the weaves implemented. Some yarns may not be connected, at least in part, but nevertheless captured by the adjacent layers of yarns.

A plurality of warp yarns 17 and/or weft yarns 19 of the preform 3 preferably bearing a hardened polymer contributing a degree of cohesion to the preform 3, at least in the portion 23, the thin edge 7 is preferably welded using said polymer borne by the yarns.

To produce this preform 3, the manufacturing method is implemented comprising a step for multilayer weaving of layers of warp yarns 17 and layers of weft yarns 19, distributing them in the thickness of the preform 3. This step can be carried out using an automated three-dimensional weaving machine, such as a loom. The thick portion 21 and the thin portion 23 are thus produced, which is in the direction of the thin edge 7 of the preform 3. The weaving machine is programmed so that the preform comprises the various aforementioned layers of warp yarns 17 and weft yarns 19, connected and arranged as defined above.

Preferably, once the weaving step is carried out, the excess portions 20 are cut, as well as any unwoven yarns. Optionally, all or some of the weft yarns 19 of the second layer T2 are also woven in the portion 23 with a weave less interlaced than in the portion 21, as described above.

Figure 3:
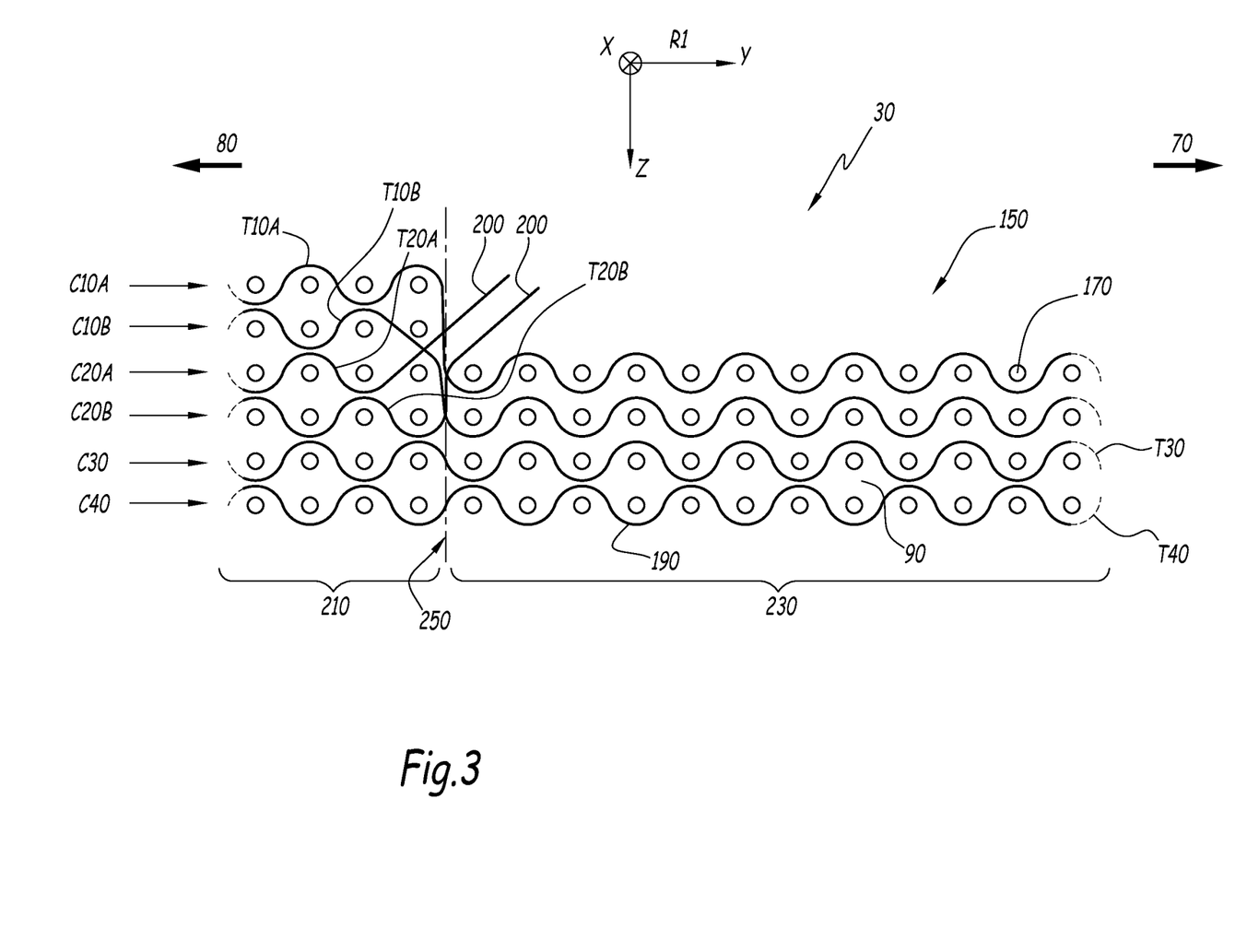
FIG. 3 is a sectional view similar to that of FIG. 2, showing a detail of a preform according to a second embodiment of the invention.

FIG. 3 shows a second embodiment of a preform 30 according to the invention, similar to the preform 3 of FIGS. 1 and 2. The preform 30 has features similar to those of the preform 3, which are designated in FIG. 3 by reference signs multiplied by 10 relative to the reference signs of FIGS. 1 and 2 associated with the corresponding features.

In this embodiment of FIG. 3, the preform 30 is made in a three-dimensional fibrous structure having a thickness, measured in the direction Z, and being woven in a single piece by multilayer weaving of successive layers C10A, C10B, C20A, C20B, C30 and C40 of warp yarns 170 and successive layers T10A, T10B, T20A, T20B, T30 and T40 of weft yarns 190 distributed along the thickness. The preform 30 defines at least one thick portion 210 and at least one thin portion 230 extending the thick portion toward a thin edge 70 of a blade 90 of the preform 30. The thin edge 70, not visible in FIG. 3, is located outside FIG. 3 to the right, as symbolized by an arrow 70. The blade 90 also comprises an opposite base 80, not visible in FIG. 3, and symbolized by an arrow 80. The preform 30 comprises two first layers C10A and C10B of warp yarns 170, the layer C10B being situated immediately below the layer C10A, the two layers C10A and C10B forming an external group of successive layers. The preform 30 also comprises two successive layers C20A and C20B of warp yarns 170, the layer C20A being situated immediately below the layer C10B, forming another group of layers of warp yarns. The preform 30 further comprises two first layers T10A and T10B of weft yarns 190 forming a first group of layers of weft yarns, which is external in the thick portion 210. The layers T10A and T10B are connected, in this example, according to a weave, respectively with the layers C10A and C10B of warp yarns 170.

In this embodiment of FIG. 3, the number of layers of warp yarns 170 making up the thin portion 230 is smaller relative to the number of layers of warp yarns 170 forming the thick portion 210, due to an absence of the two first layers C10A and C10B of warp yarns 170 in the thin portion 230. Thus, the group formed by the layers C20A and C20B of warp yarns is external in the thin portion 230. Furthermore, the first two layers T10A and T10B of weft yarns 190 extend into the thin portion 230, while being connected according to a weave, respectively with the layers C20A and C20B of warp yarns 170 in the thin portion 230, so as to form an external group of successive warp yarns also in the thin portion 230. At a junction 250 between the thick portion 210 and the thin portion 230, the excess portions 200 of the weft yarns 190 of two successive layers T20A and T20B have been cut, the layer T20A being situated immediately below the layer T10B, and the layer T20B immediately below the layer T20A. The layers T20A and T20B form a second group of successive layers of weft yarns 190.

Although in the aforementioned examples, the preforms 3 and 30 are used in the production of a stiffener 1, such preforms can also be used in the production of any other part, preferably for a framework, the part being made from a composite material including the preform and including a thin edge. For example, this part is used within a framework of a land, naval or air vehicle, or a building.

Weaves other than those shown in the figures can be implemented.

The features of each embodiment or variant described above can be incorporated into all embodiments or variants described above, as long as doing so is technically possible. In particular, a same preform may comprise both junctions similar to that of the junction 25 of FIG. 2 and junctions similar to the junction 250 of FIG. 3, in particular with the aim of creating curves for the surfaces of the blade of a preform.

The invention claimed is:

1. A preform for a stiffener, with a three-dimensional fibrous structure having a thickness and being woven in a single piece by multilayer weaving of layers of warp yarns and layers of weft yarns distributed along the thickness, the preform defining at least one first portion and at least one second portion extending the first portion toward a thin edge of the preform, the preform comprising:
a first group of successive layers of warp yarns, which includes at least one layer of warp yarns and which is external in the first portion,
a second group of successive layers of warp yarns, which includes at least one layer of warp yarns and which is located immediately below the first group of layers of warp yarns, and
a first group of successive layers of weft yarns, which includes at least one layer of weft yarns and which is connected according to a weave with the first group of layers of warp yarns, so as to be external in the first portion,
while:
the number of layers of warp yarns forming the second portion is smaller relative to the number of layers of warp yarns forming the first portion, due to the absence of the first group of layers of warp yarns in the second portion, such that the second portion has a smaller thickness relative to that of the first portion and such that the second group of layers of warp yarns is external in the second portion, and
the first group of layers of weft yarns extends into the second portion, while being connected according to a weave with the second group of layers of warp yarns in the second portion, such that the first group of layers of weft yarns is also external in the second portion;
wherein:
the weft yarns of the first group of layers of weft yarns have a yarn size smaller than the yarn size of the weft yarns of a second group of successive layers of weft yarns, the second group of layers of weft yarns including at least one layer of weft yarns and being located immediately below the first group of layers of weft yarns in the first portion; and/or
the warp yarns of the first group of layers of warp yarns have a yarn size smaller than the yarn size of the warp yarns of the second group of layers of warp yarns.

2. The preform according to claim 1, wherein, the second group of layers of weft yarns is absent from the second portion by interruption of the weft yarns of said second layer of weft yarns, at a junction of the first portion with the second portion.

3. The preform according to claim 1, wherein the preform contains 6K yarns and 3K yarns.

4. The preform according to claim 1, wherein the second portion comprises at least three layers of warp yarns.

5. The preform according to claim 1, wherein:
the preform comprises a third portion extending the second portion toward the thin edge,
the preform comprises a third group of successive layers of warp yarns, which includes at least one layer of warp yarns and which is located immediately below the first group of layers of warp yarns in the second portion, the number of layers of warp yarns forming the third portion is smaller relative to the number of layers of warp yarns forming the second portion, due to the absence of the second group of layers of warp yarns in the third portion, such that the third portion has a smaller thickness relative to that of the second portion and such that the third group of layers of warp yarns is external in the third portion, and the first group of layers of weft yarns extends into the third portion, while being connected according to a weave with the third group of warp yarns in the third portion, such that the first group of layers of weft yarns is also external in the third portion.

6. The preform according to claim 1, wherein a plurality of warp yarns and/or weft yarns of the preform bears a hardened polymer contributing a degree of cohesion to the preform at least in the second portion.

7. The preform according to claim 6, wherein the thin edge is welded using said hardened polymer borne by the yarns.

8. A framework part, comprising a preform according to claim 1, as well as a consolidating material, of the resin type, with which the fibrous structure of the preform is impregnated.

9. A method for manufacturing a preform for a stiffener, with a three-dimensional fibrous structure having a thickness and being woven in a single piece, the manufacturing method comprising a step for multilayer weaving of layers of warp yarns and layers of weft yarns distributed along the thickness, wherein one defines at least one first portion and at least one second portion extending the first portion toward a thin edge of the preform, such that the preform comprises:

a first group of successive layers of warp yarns, which includes at least one layer of warp yarns and which is external in the first portion, a second group of successive layers of warp yarns, which includes at least one layer of warp yarns and which is located immediately below the first group of layers of warp yarns, and a first group of successive layers of weft yarns, which includes at least one layer of weft yarns and which is connected according to a weave with the first group of layers of warp yarns, so as to be external in the first portion, whereas, to form the second portion:

the number of layers of warp yarns in the second portion is reduced relative to the number of layers of warp yarns forming the first portion, this reduction being obtained by the absence of the first group of layers of warp yarns in the second portion, such that the second portion has a smaller thickness relative to that of the first portion and such that the second group of layers of warp yarns is external in the second portion, and the first group of layers of weft yarns is bonded according to a weave, with the second group of layers of warp yarns in the second portion, such that the first group of layers of weft yarns is also external in the second portion;

the manufacturing method being wherein:

the weft yarns of the first group of layers of weft yarns have a yarn size smaller than the yarn size of the weft yarns of a second group of successive layers of weft yarns, the second group of layers of weft yarns including at least one layer of weft yarns and being located immediately below the first group of layers of weft yarns in the first portion; and/or the warp yarns of the first group of layers of warp yarns have a yarn size smaller than the yarn size of the warp yarns of the second group of layers of warp yarns.

10. The manufacturing method according to claim 9, wherein:

at the second portion, an excess portion of the weft yarns of the second group of layers of weft yarns comes out of the fibrous structure, and the excess portion is cut.

11. The framework part according to claim 8, wherein the framework part is a stiffener.

\* \* \* \* \*